United States Patent [19]
Kwong

[11] Patent Number: 5,126,534
[45] Date of Patent: Jun. 30, 1992

[54] TOASTER WITH COOL EXTERIOR

[75] Inventor: Wing C. Kwong, Hong Kong, Hong Kong

[73] Assignee: Goldus Industrial Limited, Hong Kong, Hong Kong

[21] Appl. No.: 667,043

[22] Filed: Mar. 11, 1991

[51] Int. Cl.$^5$ .................. F27D 11/00; H05B 3/06; A23L 1/01; A47J 27/086
[52] U.S. Cl. .................. 219/386; 219/389; 219/521; 99/329 RT; 99/329 R
[58] Field of Search ............ 219/521, 422, 388, 386, 219/400, 401, 385, 389; 99/328, 329 RT, 330, 331, 391, 392, 373, 329 R; 392/422

[56] References Cited

U.S. PATENT DOCUMENTS

| | | | |
|---|---|---|---|
| 2,113,697 | 4/1938 | Lang | 219/521 |
| 2,266,301 | 12/1941 | Biebel | 99/328 |
| 2,383,673 | 8/1945 | Olving | 219/521 |
| 2,598,592 | 5/1952 | Olson et al. | 392/422 |
| 3,363,089 | 1/1968 | Snyder | 219/521 |
| 3,461,274 | 8/1969 | Williams | 219/521 |
| 3,575,102 | 3/1969 | Parr | 99/328 |
| 4,396,825 | 8/1983 | Cox et al. | 219/521 |

Primary Examiner—Bruce A. Reynolds
Assistant Examiner—Tuan Vinh To
Attorney, Agent, or Firm—Lewis Anten

[57] ABSTRACT

A toaster having double-wall construction controls the flow of air within its interior so that its exterior is kept cool. Air intake occurs near the edge of the top toaster slot where bread or the like is inserted for toasting. Intake air then travels down the immediate interior of the toaster and is introduced to the toasting chamber and an associated warm air flow channel near the bottom of the toaster. Air warmed by the toasting chamber and associated channel rises and pulls cooler air from below. The warm exhaust air is channelled away from the cool intake air by means of a top cover.

11 Claims, 3 Drawing Sheets

TOASTER WITH COOL EXTERIOR

BACKGROUND OF THE INVENTION

A. Field of the Invention

This invention relates to a home electrical consumer product known as a toaster, for the toasting or browning of baked goods, and more particularly to the toasting of sliced bread and the like. The toaster uses heat to toast the bread, but maintains a cool exterior due to the control of air flow within a double wall construction.

B. Description of the Related Art

The toasting of food items has been a part of the culinary arts since the discovery of fire and the cooking of food. During this century, several appliances have been constructed and widely sold to help the home cook with the tasks of food preparation. One of these is the toaster, which enjoys wide use and popularity. Several toaster types and brands are currently available on the market However, only a few of these maintain a cool exterior by convective air flow. Most toasters use no means by which the toaster exterior is kept cool.

Most pertinent of the related art is U.S. Pat. No. 4,396,825 issued to Cox et al. on Aug. 2, 1983. The Cox patent discloses a toaster that is cool, at least to momentary touching. In the Cox patent, vents are located at the bottom of a double-walled toaster that allow cooling air to circulate between the walls to carry off radiated heat out of the top slot above the elements.

A problem with the construction and design of the Cox device is that the temperature of the top slot where bread is introduced remains somewhat high. In Cox, the hot air from the heating element and the now-warmed air used to cool the toaster exterior are both vented at the toaster top, with no cooling air or other means present to cool the toaster top. Further, matter such as dust or crumbs may enter the ventilation cavity of the Cox toaster due to the location of the air inlet slots at the bottom of the toaster housing.

SUMMARY OF THE INVENTION

A multi-walled toaster is disclosed that maintains a relatively cool exterior despite the presence of heating elements or heating panels within. The top of the toaster where fingers and hands are more likely to be burned by touching the toaster exterior while using the toaster is kept relatively cool.

The toaster consists of an outer shell having heating panels contained within the interior. Between the outer shell and the heating panels insulating panels are provided that form air channels. Air moves through these air channels by convection. Internal spaces are present below the heating panels and adjacent to the insulating panels, forming separate paths for air to flow, but which are connected by the space. An air flow path is formed between the heating panels and the insulating panels by extending the insulating panels beyond the height and over the top of the heating panels so that they define a space through which heated air from the heating panel may flow upwardly. This exhaust air flow path is sloped near the open slot of the toaster where bread is introduced, so as to direct the air flow into the central portion of the open slot and away from the edges of the toaster top.

The insulated panels are extended by means of a top cover that defines both entering and exiting air flow passages. Air passages are also formed between the top cover/insulating panels and the walls of the outer shell and are also between the insulating panels and the heating panels. Air enters the open slot at the top of the toaster and travels along the outer space between the wall and the insulating panels while air exiting the toaster travels along the space between the insulating panels and the heating panels. Air travels from the outer channel to the inner channel near the bottom of the toaster.

The present invention resides in the use of intentionally formed air channels that take advantage of air currents generated by convective air flow. This convective flow arises from the temperature differential between the toasting chamber 20 and regions exterior to the toasting chamber.

When bread is toasted, the heating panels becomes hot and heats the surrounding air. This hot air rises, creating an area of low pressure. Cool air below the hot air is pulled into the toasting chamber by the low pressure area, pulling along with it cooling air at the edges of the top open slot, down the space between the wall of the outer shell and the insulating panel. This air is likewise heated in the toasting chamber and travels upward, pulling with it more cool air. Air pulled into the outer air channel between the wall of the outer shell and the insulating panel keeps the wall of the toaster exterior cool. In this manner, the exterior and top of the toaster are kept cool while the bread is toasted by thermal radiation and convection.

OBJECTS OF THE INVENTION

It is an object of this invention to provide a toaster having a relatively cool exterior.

It is still another object of this invention to provide a toaster that keeps its exterior cool by drawing air in at the top of the toaster.

It is yet another object of this invention to provide a cool-exterior toaster having a plurality of air flow channels.

These and other objects and advantages of the present invention will be apparent from a review of the following specification and accompanying drawings.

DESCRIPTION OF THE PREFERRED EMBODIMENTS

Toasters are well known in the art and their pedestrian components are not elaborated upon.

Figure 1:
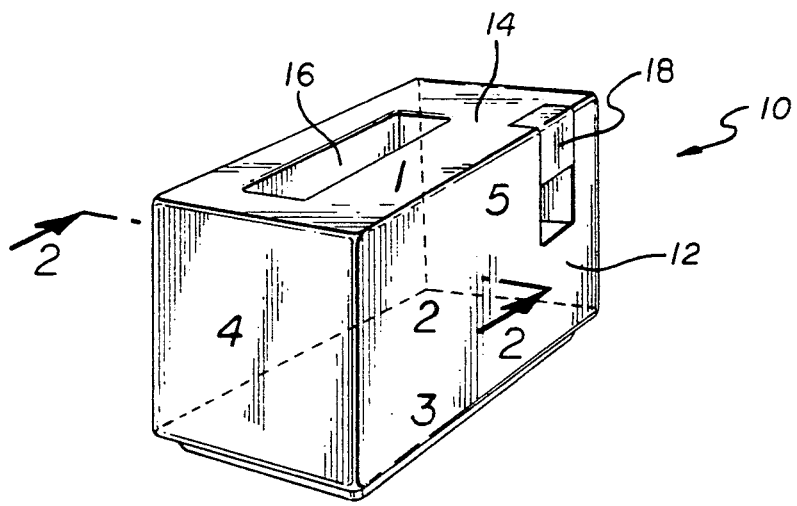
FIG. 1 is perspective view of the toaster.

FIG. 1 shows the toaster 10 of the present invention. An exterior shell 12 has a top 14 with a slot 16 for the insertion of bread or other food items to be toasted. A front button switch 18 for activation of the toasting cycle is conveniently located at the front of the toaster 10. Button switch 18 is depressed to activate the toasting cycle and may remain depressed for the duration of the toasting cycle. Upon termination of the toasting cycle, the button switch 18 returns to its original off position.

Figure 2:
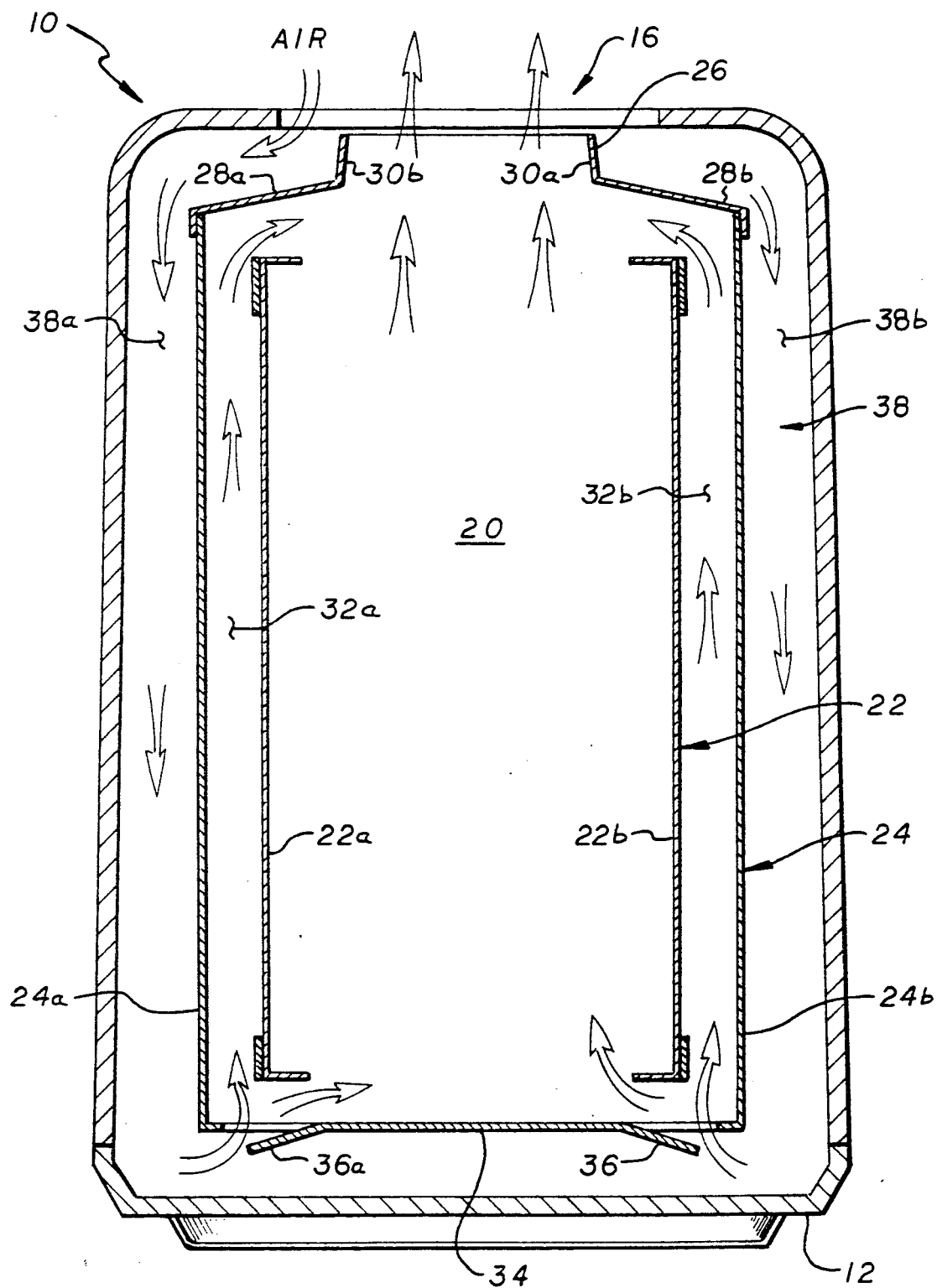
FIG. 2 is a section view of the toaster shown in FIG. 1 taken generally along line 2—2.

In FIG. 2, a cross section of FIG. 1 is shown. Two heating panels 22 are spaced apart to form a toasting chamber 20. Spaced away from the outside of heating panels 22 are insulating panels 24. Resting upon and attached to the insulating panels 24 is a top cover 26. The top cover 26 fits over the top of the insulating panels 24 and has an inclined portion 28 projecting towards the interior of the toaster 10, and has protruding walls 30 that project upwardly from the edge of the inclined portion 28 away from the toaster interior and towards the toaster top slot 16. The heating system panels 22, their tops, and their bottoms preferably have no contact with the insulating panels 24 so as to create well-defined upward air flow channels 32. However, supports for the heating system panels 22 and for the insulating panels 24 need to be present and may be placed at certain interior portions of the toaster (not shown).

Below the heating system panels 22, and at approximately the same height as the lower edge of the insulating panels 24, a bottom cover 34 is present that underlies the toasting chamber 20. The bottom cover 34 is fixed in position The bottom cover 34 enjoys some space between it and the bottom of the heating system panels 22 and is supported by posts or other means (not shown).

A crumb tray 31 may be removably affixed near the bottom of the toaster interior to make crumbs and other particles easy to remove. An air tight bushing 33 may be used in conjunction with the crumb tray 31 to ensure proper air flow and prevent any air from entering the toaster interior from the bottom.

Attached to the outward edges of the bottom cover 34, two inclined flaps 36 extend some distance away from both the bottom cover 34 and the toasting chamber 20. For the most part, both the bottom cover 34 and the inclined flaps 36 stand free of surrounding portions of the toaster interior and form openings with the insulating panels 24. Air flows through these openings into the toasting chamber 20.

Surrounding the foregoing internal structures is the exterior shell 12 that is spaced away from the top cover 26, the insulation panels 24, and the bottom cover 34 with its inclined flaps 36. If kept sufficiently cool, the outer toaster shell 12 may be constructed of various materials, including plastic. However, metals or insulators that can withstand higher temperatures are preferred. The present invention at least partially resides in the structure and spatial definition given to the toaster interior by these components.

The heating system panels 22 may be composed of electrical heating elements or other means that accomplish the task of browning bread or other material (hereinafter, all toasted materials are referred to as "bread") between them by heat. The bread is toasted on each side by one of the two heating system panels 22a, 22b, respectively.

Heating system 22, insulating panel 24, and outer toaster shell 12 form three channels for air flow. The first air flow channel is the toasting chamber itself 20. Air is heated by the two interior sides of the toasting chamber 20 by the two heating system panels 22a and 22b.

Second air flow channels 32a, 32b, are formed in the space between the heating system panels 22a, 22b, and insulating panels 24a, 24b. Insulating panels 24 form channels 32 with the heating system panels 22 for the upward flow of this warm air generated by the outside of the toasting chamber 20. Air enters the second and first flow channels through openings present near the bottom of the toaster. These openings are defined by gaps present between the bottom cover 34 with inclined flaps 36 and the insulating panels 22.

The air flowing through the openings defined by the insulating panels 24 and the inclined flaps 36, and into the first 20 and second 32 air flow channels, has its source in the space 38 between the insulating panels 24 and the outer toaster shell 12. The air flowing through this third air flow channel 38, this downward air flow channel, acts to cool the outer toaster shell 12 interior and insulating panel 24 exterior.

This air has its source at the outward edges of the top slot 16 of the toaster 10. This top slot 16 source of air flowing through the air channels of the toaster gives the slot edge and the outer shell portion immediately adjacent to the slot the advantage of having the coolest air flow past it. It can be seen that the portion of the toaster top closest to the toasted bread is the part of the toaster where fingertips and hands are most likely to touch the toaster and be burned when reaching for bread that has just been toasted. Herein lies an inventive element of the toaster.

In toasting the bread, the heating system panels 22 heat and expand the surrounding air, which in turn makes the air lighter and less dense. The hot air rises, pulling with it cooler air from beneath it through the openings between the bottom cover 34 and insulating panels 22.

When the warm air generated by the heating system panels 22 in the toasting chamber 20 and the second air flow channels 32 rises, it ultimately meets with the top cover 26. The gradually ascending slope of the top cover 26 allows the warm air to continue its upward motion, but directs the air flow towards the center of the toaster interior Upon reaching the upwardly protruding walls 30, the inclined portion 28 ends and the warm air is then allowed to rise freely in a vertical manner. The warm air then exits the toaster interior by passing between the protruding walls 30 and rising up and through the central portion of the top slot 16 of the toaster 10.

The evacuation of warm air from the first upward air flow channel (the toasting chamber) 20 and from the second upward air flow channels (formed between the heating system panels and the insulating panels) 32 causes cooler air to flow into that evacuated space from openings present between the inclined flaps 36 and the bottom of the insulating panels 24. This air is pulled into the first and second channels 20, 32 by the rising warm air generated by the heating system panels 22. The air travelling into the evacuated space is then also heated by the heating system panels 22, which causes this air to rise, which in turn pulls more air in from the openings defined between the inclined flaps 36 and the insulating panels 24. An ongoing cycle of heating air near the toasting chamber 20, allowing it to escape through the top slot 16, and replacing the escaping air with cooler air that previously passed down the toaster interior, occurs throughout the time bread is toasted in the toaster.

The air flowing upwardly through the first air flow channel 20 somewhat cools the toaster interior, but does so significantly less than the second air flow channel 32. Instead of cooling the toaster interior, the toasting chamber 20 must be hot enough to toast the bread by radiant heat.

The air that flows through the second upward air flow channel 32 is responsible for carrying away much, if not most, of the heat normally transferred to the exterior of the toaster 10 and making it hot to the touch. The second air flow channel 32 is unobstructed by objects that would create turbulent air flow (as is experienced in the first upward air flow channel 20 with its toasting bread), and so the air flowing through the second upward air flow channel 32 experiences predominately laminar air flow. Air in the second upward air flow channel 32 is unimpeded and flows smoothly and more quickly than the air flowing through the first upward air flow channel 20. A greater volume of air is carried through the second upward air flow channel 32, and as a result, more heat is carried away from the interior of the toaster by the air flowing in the second upward air flow channel 32 than from that flowing in the first upward air flow channel 20. The second upward air flow channel 32 is narrower than the third downward air flow channel 38. Air flows faster through the narrower second channel 32 and carries off heat in a correspondingly swift manner.

It is believed that the second upward air flow channel 32 that is responsible for carrying away most of the exhaust heat of the toaster 10. Air flow channels 32 encompass a smaller volume than present in air flow channel 20. Due to this smaller volume, the second air flow channels 32 become hotter more quickly which causes air flowing through them to rise more quickly. A greater volume of heated air evacuates from air flow channels 32 causing more cool air to be pulled in from the bottom.

The insulation panels 24 do prevent some thermal radiation from reaching the toaster's exterior, however, their greatest advantage is in their capacity for defining air flow channels 32 and not in their capacity for insulating the toaster exterior 12 from the radiated heat of the toasting chamber 20.

Both warm exhaust and cool intake air share the same top toaster slot 16 for their respective exit and entrance. Little, if any, warm exhaust air mixes with the cool intake air. If the warm exhaust air does mix wit the cool intake air, it is to such a slight degree that the operation of the cool intake air in keeping cool the outer toaster shell 12 is not adversely affected.

The top cover 26, and especially the protruding walls 30, serve to separate and channel the upward-flowing, warm exhaust air. The upward-flowing exhaust air is separated from the downward flowing intake air by the top cover 26. The protruding walls 30 serve to channel the warm exhaust air in a generally upward manner and give this upward flowing air the propensity for laminar flow as it exits the toaster 10 through the central portion of the top toaster slot 16. As the air flow currents are defined near the top toaster slot 16 upon the initial activation of a cool toaster implementing the present invention, warm exhaust air rises from the central portion of the top toaster slot 16 and away from the toaster 10 while cool intake air is pulled into the toaster's downward air flow channels from cool air adjacent to the edges of the top toaster slot 16.

Ideally, the interface between the warm exhaust air current and the cool intake air current is stable with no transfer of heat across it. However, as there is some heat transfer, the distinct definition of the exhaust current by the protruding walls 30 helps to keep the exhaust air from affecting too much the cooling intake air.

Of importance are the openings and channels through which air flows through the toaster. By experiment, it has been determined that the following approximate dimensions yield a toaster 10 that has a cool exterior while enjoying consistently toasted bread slices:

the power, or rating, of the toaster is one hundred twenty volts AC at sixty Hertz, producing nine hundred ninety watts of power;

the width of the downward cool air flow channel 38 is ten mm;

the width of the second upward air flow channel 32 is eight mm;

the height of the protruding wall 30 over the top cover 26 is four mm;

the distance between the top of the protruding wall 30 and the top toaster slot 16 is one mm;

the inclined flap 36 size is eleven mm by fifty-five mm;

the opening defined by the inclined flap 36 is four mm by fifty-five mm;

the number of inclined flap 36 openings is eight;

the width of the toasting chamber 20 is sixty mm;

the height of the toasting chamber 20 is two hundred fifty mm; and the length of the toasting chamber is subject to design preference so long as the previous specifications are observed.

The gap between the protruding wall and the top toaster slot may be more than one mm, however, larger openings may allow more heated air to enter the third air flow channel 38 and warm the toaster exterior. Larger gaps may not prevent adequate cooling, but may increase the exterior temperature.

It is contemplated that intake slots at or near the top of a toaster 14 may also be present so that the exterior of the toaster 12 may be cooled by convective air flow. However, such designs may not cool the very top 14 of the toaster's outer shell to the degree that the preferred embodiment does as the cooling intake air may not flow past the edge of the toaster's top slot 16.

Tests have been conducted using a toaster as described above. In cycling the toaster through twelve cycles at the toaster's darkest setting, it has been found that the top of the toaster near the top slot attains thermal equilibrium at about 55° C. The side panel of the toaster farthest away from the button switch 18 attained the highest thermal equilibrium at 60° C. The middle of the front panel, the bottom of the front panel, and the side panel of the toaster nearest the button switch attained a thermal equilibrium of about 50° C.

In attaining what is believed to be the best mode of the present invention, it has been discovered that the size of the air inlet for the toasting chamber 20 and the second upward air flow channel 32 as defined by the inclined flaps 36 should be at least approximately the same as the size of the cool air intake at the edges of the top slot 16 of the toaster 10 as defined by the top slot edge and the top of the protruding walls 30. The cool air intake is approximately the same width as the third air flow channel. It is believed that this relationship is due to the flow of equal volumes of air past these two openings. As such, the degree of inclination of the inclined flaps 36 determines the rate of air flow through the toaster 10 by defining the width of the bottom opening air inlet. The degree of inclination of the inclined flaps 36 also controls the escape of radiation from the toasting chamber 20 past the insulating panels 24.

Figure 3:
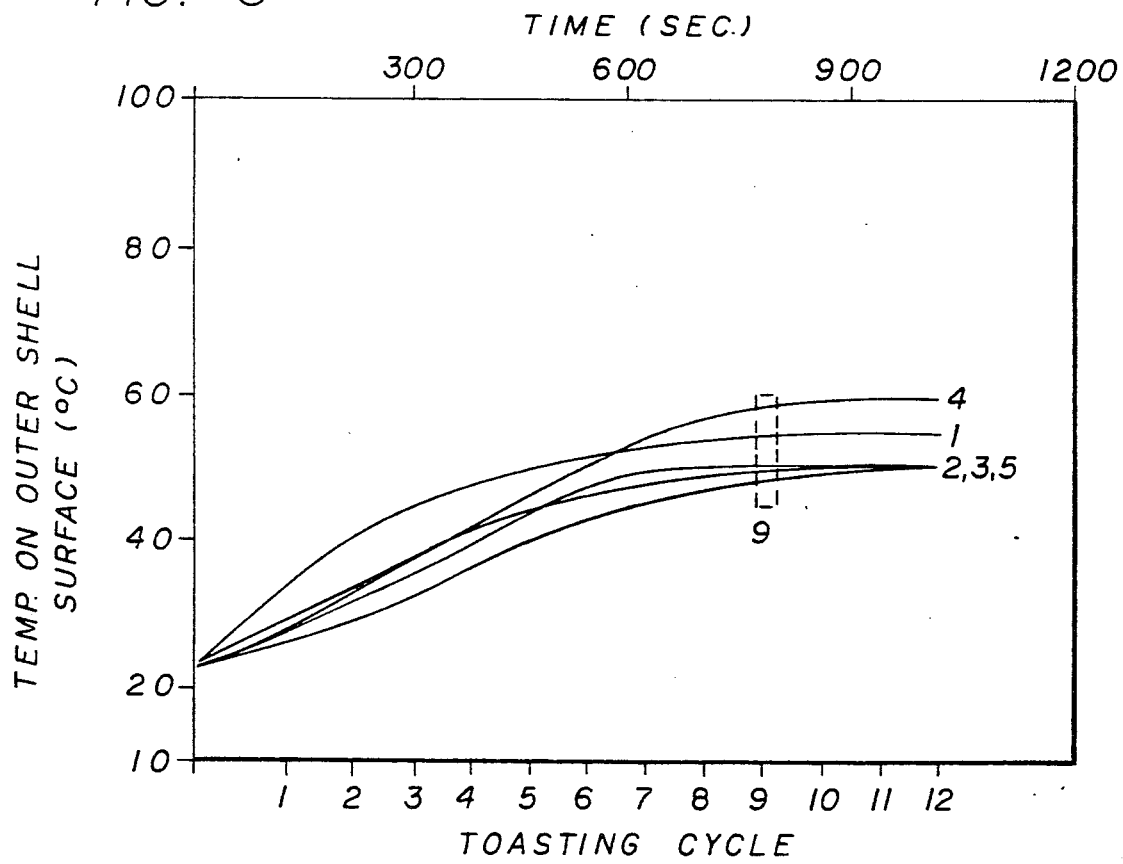
FIG. 3 is a graph of temperature (° C.) versus number of consecutive toasting cycles (number of toasts) for different sides of a toaster having the preferred configuration.
Figure 4:
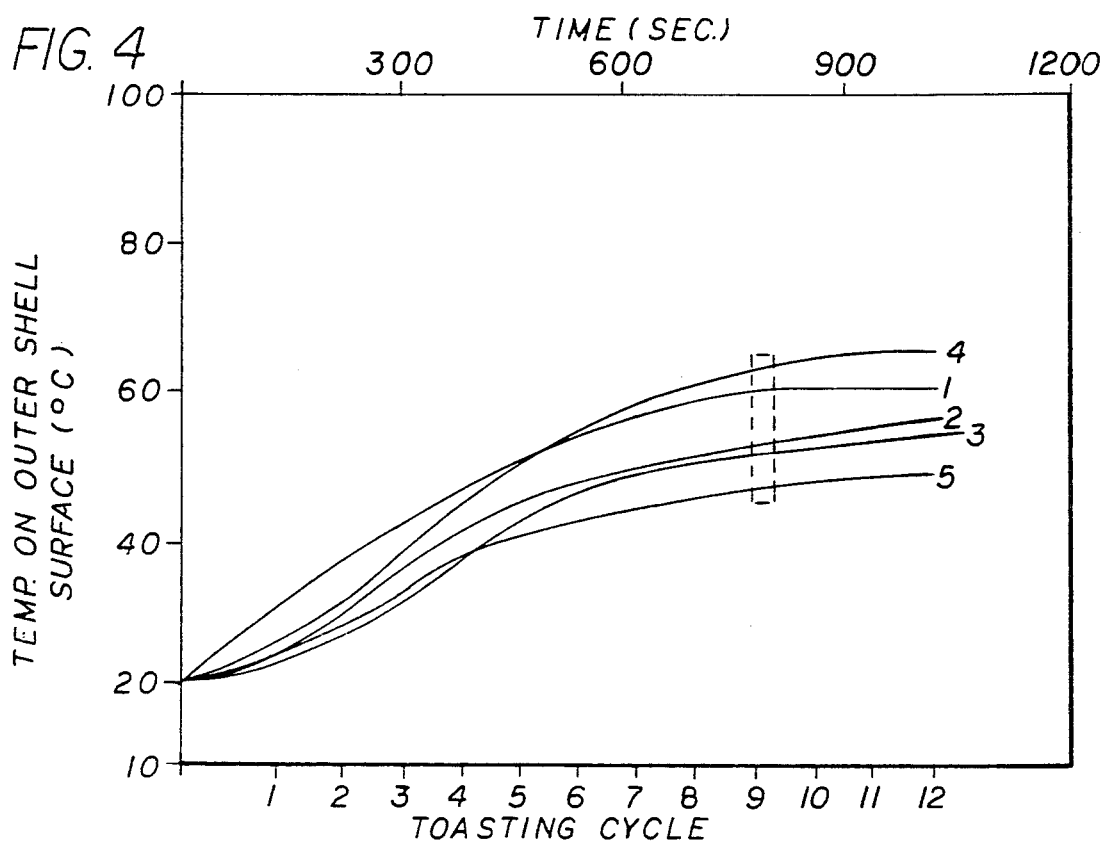
FIG. 4 is a graph of temperature (° C.) versus number of consecutive toasting cycles (number of toasts) for different sides of a toaster having a smaller opening at the inclined flaps.
Figure 5:
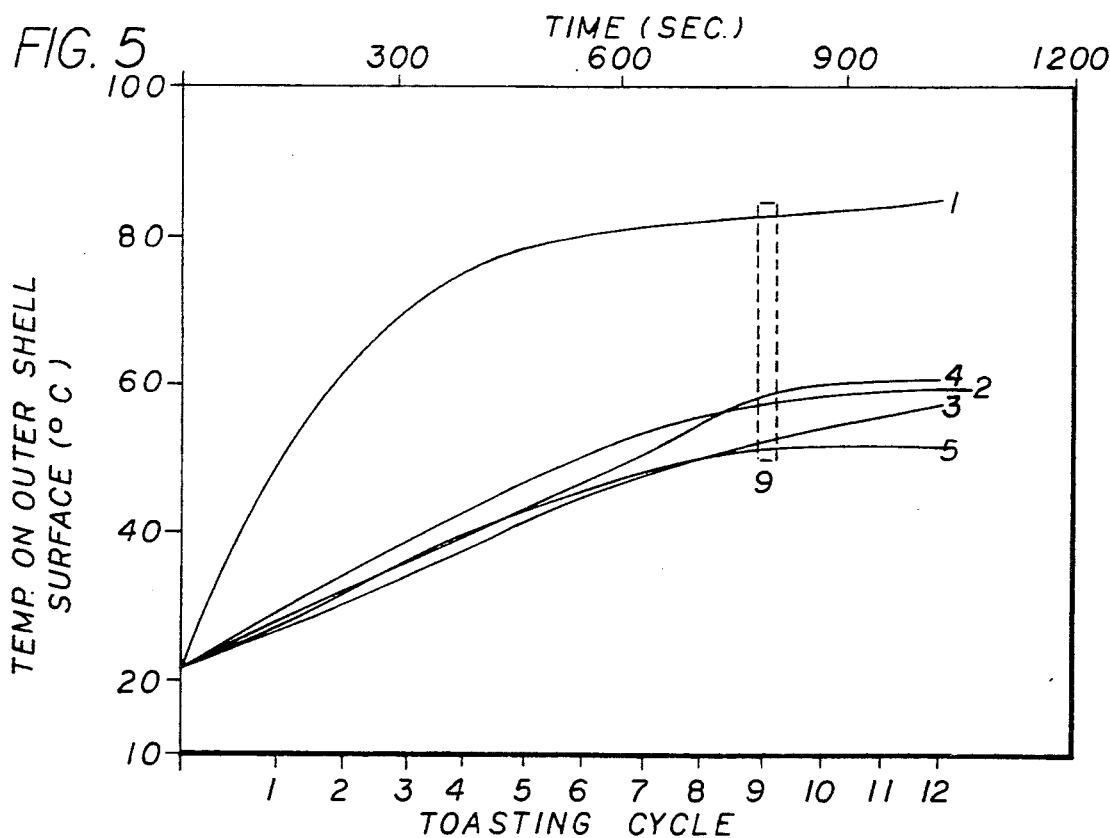
FIG. 5 is a graph of temperature (° C.) versus number of consecutive toasting cycles (number of toasts) for different sides of a toaster having a metal top cover, but no protruding walls.

Results generated by experiment are shown in FIGS. 3, 4, and 5. FIG. 3 shows temperature results for a toaster using the preferred toaster configuration. FIG. 4 shows results for a toaster similar to the preferred configuration, but having a smaller opening defined by the inclined flaps. FIG. 5 shows results for a toaster similar to the preferred configuration, but having no protruding walls with its top cover.

In the graphs, the numbers accompanying the drawn lines signify the place on the toaster exterior where the temperature was measured. Number 1 corresponds to the toaster top 14. Number 2 corresponds to the middle of the toaster front panel. Number 3 corresponds to the bottom of the toaster front panel. Number 4 corresponds to the toaster side farthest from the button switch 18. Number 5 corresponds to the toaster side nearest to the button switch 18.

The results in FIG. 3 have been stated above as the results from experiments using the preferred toaster configuration. The far side 4 of the toaster becomes the hottest at 60° C. and the toaster top 14 becomes somewhat cooler at 55° C. The toaster sides become 50° C.

The results in FIG. 4 show the temperature increases experienced by a toaster having an opening at its inclined flaps only two mm wide. Generally, all temperatures experience some increase, with the far toaster side 4 and the toaster top 1 becoming the hottest. The far toaster side 4 goes to 65° C., while the toaster top 1 goes to 60° C.

As shown in FIG. 5, the worst results obtained, yielding the highest temperatures, occurred when the protruding walls 30 were removed. This left the metal top cover six millimeters below the top slot 16. It is possible, if not likely, that warmed air within the toaster interior was allowed to recirculate within the toaster. This would allow air once warmed by the heating system panels 22 to become even hotter with a second warming. When the walls 30 of the top cover 26 were removed, the toaster top 1 rose to a temperature of 85° C. while the farthest toaster 4 side rose only to approximately 61° C. The front toaster 2, 3 side also became warmer, approaching 60° C.

According to the Cox patent at column 1, Underwriters Laboratory set temperature standards for continuous and momentary contact for metallic and non-metallic members of electric irons. These were: 55° C. for continuous and 60° C. for momentary contact with metal members, and 75° C. for continuous and 85° C. for momentary contact with non-metallic members In the preferred embodiment, the present invention maintains its external temperature below that required for momentary contact with metal members, 60° C., and tends towards a maximum equilibrium temperature there.

For the Cox device, after only nine toastings, only one temperature was below the 60° C. level, that of the shoulder (C) of the "Nozzle-type Deflector (FIG. 5)". Column 7 of the Cox patent shows temperature readings made for various numbers of toasting cycles on Table 1. These results are compared with those of the present invention below.

| ARRANGE-MENT | NO. OF CYCLES | WALL TEMPERATURE | | | |
|---|---|---|---|---|---|
| | | SLOT EDGE | | SHOULDER* | |
| | | °F. | °C. | °F. | °C. |
| Cox "Square" Deflector | 9 | 173 | 78 | 155 | 63 |
| Cox Nozzle-type Deflector | 9 | 154 | 68 | 139 | 59 |
| Present Invention | 9 | ~131 | 55 | ~122 | 50 |

*"shoulder" for the present invention is the temperature at 2.

From these results, it can be seen that the present invention does cool the top portion of a toaster more than the configuration present in the Cox device.

A toaster having more than one central slot is an alternative embodiment of the present invention. When such a toaster is used, much of the exhaust heat will rise up and away from the toaster and the slots. The immediate interior of such a multi-slot toaster incorporates the internal structure described above in order to cool its exterior. The air flow channels used to cool the exterior of the one slot toaster are adapted to serve the same purpose in a multi-slot toaster. However, it is contemplated that air flow channels most usefully cool the toaster exterior when adjacent to it. Air flow channels may be less usefully placed between slots and/or heating panel pairs.

While the present invention has been described with regards to particular embodiments, it is recognized that additional variations of the present invention may be devised without departing from the inventive concept.

What is claimed is:

1. A toaster having a cooled exterior, comprising:
   at least one toasting- chamber defining a first air flow channel;
   at least one insulating panel spatially separate from said toasting chamber and defining a second air flow channel;
   at least one top cover connected to a top of said insulating panel, said top cover directing the flow of air travelling upward from said first and second air flow channels;
   at least one bottom cover underlying said toasting chamber, said bottom cover defining an opening between a bottom of said insulating panel and said bottom cover; and
   an exterior shell encompassing said toasting chamber, said insulating panel, said top cover, and said bottom cover, wherein said exterior shell has at least one top slot present for the introduction of items to said toasting chamber, and wherein said exterior shell is spatially separate from said insulating panel to define a third air flow channel; whereby
   air flows initially through said top slot, down said third air flow channel, through said opening to said first and second air flow channels, then upwardly through said first and second air flow channels, past said top cover and out said top slot.

2. The toaster of claim 1, wherein:
   said toasting chamber is sixty millimeters wide and two hundred fifty millimeters high, said second air flow channel is eight millimeters wide, and said third air flow channel is ten millimeters wide.

3. The toaster of claim 1, wherein:
   said top cover comprises at least one inwardly extending and upwardly inclined portion.

4. The toaster of claim 1, wherein:

said top cover further comprises at least one protruding wall.

5. The toaster of claim 4, wherein:
said protruding wall upwardly protrudes and is not more than one millimeter below said top slot.

6. The toaster of claim 1, wherein:
said bottom cover further comprises at least one inclined flap.

7. The toaster of claim 6, wherein:
said inclined flap defines an opening with said insulating panel of not less than four millimeters.

8. The toaster of claim 1, wherein:
said top slot of said exterior shell is wider than an opening defined by said top cover.

9. The toaster of claim 8, wherein:
an opening defined by an edge of said top slot and a top edge of said top cover is at least of approximately same cross-sectional area as said opening between said at least one insulating panel and said bottom cover.

10. The toaster of claim 9, wherein:
an opening defined by an edge of said top slot and a top edge of said top cover is at least of approximately same cross-sectional area as width of said third air flow channel.

11. A toaster, having a cool exterior, comprising:
a toasting chamber approximately sixty millimeters wide and approximately two hundred fifty millimeters high in cross-section, said toasting chamber having heating means along its periphery whereby bread may be toasted within said toasting chamber;

an insulating panel spaced away from and external to said toasting chamber, said insulating panel defining with said toasting chamber a first air flow channel approximately eight millimeters wide;

a top cover attached to a top edge of said insulating panel, said top cover having an inclined portion extending inwardly towards, but upwardly away from, said toasting chamber and having a protruding wall extending upwardly away from said toasting chamber and said insulating panel;

a bottom cover having inclined flaps, said bottom cover underlying said toasting chamber and defining an opening of approximately four millimeters with said insulating panel; and an outer shell surrounding said toasting chamber, said insulating panel, said top cover, and said bottom cover, said outer shell having a slot at its top and defining a second air flow channel approximately ten millimeters wide with said insulating panel said top slot for the introduction of bread to the toasting chamber and for the intake and exhaust flow of air, said top slot not more than approximately one millimeter above said top cover, whereby an air intake opening defined between an edge top slot and said top cover is at least of approximately same cross-sectional area as said opening defined by said bottom cover and said insulating panel.

* * * * *